United States Patent
Zhang et al.

(10) Patent No.: US 10,975,927 B2
(45) Date of Patent: Apr. 13, 2021

(54) BRAKE DEVICE FOR ELEVATOR AND AN ELEVATOR SYSTEM

(71) Applicant: Otis Elevator Company, Farmington, CT (US)

(72) Inventors: Zixu Zhang, Tianjin (CN); GuoChen Gao, Tianjin (CN); RuGuang Liu, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 60 days.

(21) Appl. No.: 16/541,508

(22) Filed: Aug. 15, 2019

(65) Prior Publication Data
US 2020/0056666 A1  Feb. 20, 2020

(30) Foreign Application Priority Data
Aug. 17, 2018  (CN) .......................... 201810940991.X (51) Int. Cl.
*F16D 59/02*  (2006.01)
*F16D 55/38*  (2006.01)
*B66D 5/30*  (2006.01)
*F16D 121/22*  (2012.01)
*F16D 127/00*  (2012.01)

(52) U.S. Cl.
CPC .............. *F16D 55/38* (2013.01); *B66D 5/30* (2013.01); *F16D 2121/22* (2013.01); *F16D 2127/001* (2013.01)

(58) Field of Classification Search
CPC .......... F16D 55/00; F16D 55/38; F16D 59/02; F16D 63/002; F16D 2055/0075; F16D 2121/22; F16D 2127/001; B66D 5/30

USPC ....................................... 188/71.1, 72.1, 171
See application file for complete search history.

(56) References Cited

U.S. PATENT DOCUMENTS

| | | | |
|---|---|---|---|
| 4,142,610 A | 3/1979 | Alexander et al. |
| 4,993,532 A | 2/1991 | Weiss et al. |
| 5,145,035 A | 9/1992 | Garrido et al. |

(Continued)

FOREIGN PATENT DOCUMENTS

| | | | |
|---|---|---|---|
| CN | 100371620 C | 2/2008 |
| CN | 100458208 C | 4/2009 |

(Continued)

OTHER PUBLICATIONS

European Search Report for application EP 19192391.1, dated Feb. 28, 2020, 120 pages.

*Primary Examiner* — Thomas W Irvin
(74) *Attorney, Agent, or Firm* — Cantor Colburn LLP (57) ABSTRACT

An elevator braking device and an elevator system are provided by the present disclosure. The elevator braking device includes: a fixed frame; a floating bracket, which is disposed on the axial guide of the fixed frame and movable along the axial guide; a movable plate supported by the floating bracket, the movable plate having a second friction plate on a second side of the brake disc; an actuator; and a position self-adjusting member which includes a magnetic portion to act on the magnetic member on the floating bracket such that after the braking state is released, the floating bracket tends to move towards a balanced position, thereby reducing a difference between a first gap G1 between the first friction plate and the brake disc and a second gap G2 between the second friction plate and the brake disc.

20 Claims, 5 Drawing Sheets

(56) References Cited

U.S. PATENT DOCUMENTS

| | | | | |
|---|---|---|---|---|
| 5,154,261 | A | * | 10/1992 | Tanaka ............... B66D 5/14 188/171 |
| 6,536,563 | B1 | * | 3/2003 | Schlehbusch ......... F16D 55/28 188/161 |
| 8,091,691 | B2 | * | 1/2012 | Qu ..................... B66D 5/30 188/171 |
| 8,146,718 | B2 | * | 4/2012 | Wagner ............. B25J 19/0004 188/171 |
| 9,112,388 | B2 | * | 8/2015 | Imai .................. F16D 59/02 |
| 9,261,153 | B2 | | 2/2016 | Miller |
| 9,688,512 | B2 | * | 6/2017 | West ................. B66B 5/18 |
| 2003/0111306 | A1 | * | 6/2003 | Watanabe ........... B66B 5/0037 188/180 |
| 2009/0194370 | A1 | * | 8/2009 | Fargo ................. B66D 5/30 187/250 |
| 2010/0078270 | A1 | * | 4/2010 | Wagner ............. B25J 19/0004 188/74 |
| 2010/0122876 | A1 | | 5/2010 | Cao et al. |
| 2012/0000742 | A1 | * | 1/2012 | Sekella ............... F16D 55/28 192/18 B |
| 2015/0259175 | A1 | * | 9/2015 | West ................... F16D 63/008 187/359 |

FOREIGN PATENT DOCUMENTS

| | | |
|---|---|---|
| CN | 106286642 A | 6/2014 |
| CN | 203627616 U | 6/2014 |
| CN | 204784313 U | 11/2015 |
| CN | 105465244 A | 4/2016 |
| CN | 104755784 B | 5/2017 |
| EP | 1686281 B1 | 8/2006 |
| EP | 2441724 A1 | 4/2012 |
| JP | S5529745 U | 2/1980 |
| JP | S5582831 A | 6/1980 |
| JP | 2007255643 A | 10/2007 |
| JP | 2011058584 A | 3/2011 |
| KR | 20050049621 A | 5/2005 |
| WO | 2013076788 A1 | 5/2013 |
| WO | 2018065193 A1 | 4/2018 |

* cited by examiner

BRAKE DEVICE FOR ELEVATOR AND AN ELEVATOR SYSTEM

FOREIGN PRIORITY

This application claims priority to Chinese Patent Application No. 201810940991.X, filed Aug. 17, 2018, and all the benefits accruing therefrom under 35 U.S.C. § 119, the contents of which in its entirety are herein incorporated by reference.

FIELD OF THE INVENTION

The present disclosure relates to the field of elevator braking devices, and in particular to an elevator braking device capable of self-adjusting, an elevator drive mechanism having the elevator braking device, and an elevator system having the elevator braking device.

BACKGROUND OF THE INVENTION

In the prior art, an elevator braking device is typically disposed in an elevator machine room. An elevator drive mechanism is provided with a brake disc, and friction plates are disposed on both sides of the brake disc. After receiving a braking signal, the friction plates on both sides will clamp the brake disc to form a braking force, so that an elevator drive shaft stops rotating, thereby stopping an elevator car. After receiving a braking releasing signal, the friction plates on both sides move to separate from the brake disc.

In such a braking device, there may be a case where gaps between the two friction plates and the brake disc vary greatly. For example, the friction plate on one side is closer to the brake disc, while the friction plate on the other side is further from the brake disc. When the gap between the friction plate and the brake disc are too small, the brake disc will be subject to an axial force or one-sided wear of the brake disc, thus affecting a service life of the brake disc and the friction plates, and even affecting a response time of the braking device.

SUMMARY OF THE INVENTION

It is an object of the present disclosure to solve or at least alleviate the problems in the prior art.

It is an object of the present disclosure to ensure that there are significant gaps between the brake disc and the friction plates on both sides in a braking released state.

In one aspect, an elevator braking device is provided, which includes:

a fixed frame, on which an axial guide is disposed;

a floating bracket, which is disposed on the axial guide of the fixed frame and movable along the axial guide, the floating bracket being provided with a magnetic member and including a first friction plate on a first side of the brake disc;

a movable plate supported by the floating bracket, the movable plate having a second friction plate on a second side of the brake disc;

an actuator which acts on the movable plate such that the movable plate is capable of axially moving closer or away from the brake disc; and a position self-adjusting member, which includes a magnetic portion to act on the magnetic member on the floating bracket such that after the braking state is released, the floating bracket tends to move towards a balanced position, thereby reducing a difference between a first gap G1 between the first friction plate and the brake disc and a second gap G2 between the second friction plate and the brake disc.

Optionally, in the elevator braking device, a position of the magnetic portion of the position self-adjusting member can be adjusted in an axial direction, thereby setting the balanced position.

Optionally, in the elevator braking device, a position of the magnetic portion of the position self-adjusting member is set such that in the balanced position, the first gap G1 and the second gap G2 satisfy 0.5G2<G1<1.5G2.

Optionally, in the elevator braking device, a position of the magnetic portion of the position self-adjusting member is set such that in the balanced position, the first gap G1 and the second gap G2 are substantially equal.

Optionally, in the elevator braking device, the position self-adjusting member is connected to the fixed frame.

Optionally, in the elevator braking device, the position self-adjusting member includes a magnetic portion and a screw portion connected to the magnetic portion, wherein the screw portion is connected to an axial threaded hole of the fixed frame, and a position of the magnetic portion of the position self-adjusting member is adjusted by adjusting a depth at which the screw portion is screwed into the threaded hole.

Optionally, in the elevator braking device, the magnetic portion of the position self-adjusting member and the magnetic member on the floating bracket are both permanent magnets.

Optionally, in the elevator braking device, the magnetic member on the floating bracket includes a first permanent magnet and a second permanent magnet that are axially spaced apart, the magnetic portion of the position self-adjusting member is disposed between the first permanent magnet and the second permanent magnet, the first permanent magnet is located on a first side of the magnetic portion of the position self-adjusting member and repels a first side of the magnetic portion of the position self-adjusting member, and the second permanent magnet is located on a second side of the magnetic portion of the position self-adjusting member and repels a second side of the magnetic portion of the position self-adjusting member.

Optionally, in the elevator braking device, the magnetic portion of the position self-adjusting member includes a first permanent magnet portion and a second permanent magnet portion that are axially spaced apart, the magnetic member on the floating bracket is located between the first permanent magnet portion and the second permanent magnet portion, the first permanent magnet portion is located on a first side of the magnetic member on the floating bracket and repels a first side of the magnetic member on the floating bracket, and the second permanent magnet portion is located on a second side of the magnetic member on the floating bracket and repels a second side of the magnetic member on the floating bracket.

Optionally, in the elevator braking device, the axial guide is formed as a plurality of guide pins, and the plurality of guide pins are inserted into the floating bracket.

Optionally, in the elevator braking device, the floating bracket has an extension around the guide pins.

Optionally, in the elevator braking device, a friction coefficient between the plurality of guide pins and the floating bracket is less than 0.2.

Optionally, in the elevator braking device, sliding bearings are disposed between the plurality of guide pins and the floating bracket.

Optionally, in the elevator braking device, the actuator is fixedly connected to the floating bracket.

Optionally, in the elevator braking device, the actuator includes an actuator body, springs are disposed between the actuator body and the movable plate, the actuator body includes a cavity for accommodating a plunger of the movable plate, and a coil is disposed around the cavity, wherein when the coil is energized, the actuator attracts the movable plate to separate from the brake disc against the forces of the springs, and when the coil is de-energized, the movable plate approaches and contacts the brake disc under the action of the springs.

Optionally, in the elevator braking device, the actuator is connected to the floating bracket through a plurality of axial screws.

Optionally, in the elevator braking device, the plurality of axial screws pass through the movable plate.

Optionally, in the elevator braking device, the brake disc is connected to an elevator drive shaft.

Optionally, in the elevator braking device, the magnetic member is located at the top of the floating bracket.

In another aspect, an elevator system is provided, which includes an elevator braking device in accordance with various embodiments.

The elevator braking device according to the present disclosure ensures significant gaps between the brake disc and the friction plates on both sides, thus avoiding excessive wear on one side of the brake disc or axial force on the brake disc.

BRIEF DESCRIPTION OF THE DRAWINGS

The contents of the present disclosure will become more easily understood with reference to the accompanying drawings. Those skilled in the art can readily appreciate that the drawings are for illustrative purposes only, instead of being intended to limit the scope of protection of the present disclosure. In addition, similar numbers in the drawings are used to indicate similar parts, wherein.

DETAILED DESCRIPTION OF THE EMBODIMENT(S) OF THE INVENTION

It will be readily understood that, based on the technical solutions of the present disclosure, those skilled in the art can propose various alternative embodiments and implementations without departing from the true spirit of the present disclosure. Therefore, the following detailed description and the accompanying drawings are merely exemplary description of the technical solutions of the present disclosure, which shall not be deemed as the whole of the present disclosure or as limiting or restricting the technical solutions of the present disclosure.

Such orientation terms as top, bottom, left, right, front, rear, front side, back side, top, bottom and so on that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

An elevator braking device according to an embodiment of the present disclosure will be described in detail with reference to FIGS. 1 to 4. The elevator braking device includes: a fixed frame 1, on which an axial guide is disposed; a floating bracket 2, which is disposed on the axial guide of the fixed frame and movable along the axial guide, the floating bracket 2 being provided with magnetic members 21, 22 and including a first friction plate 25 on a first side of the brake disc 6; a movable plate 4 supported by the floating bracket 2, the movable plate 4 having a second friction plate 41 on a second side of the brake disc 6; an actuator 5 which acts on the movable plate 4 such that the movable plate 4 is capable of axially moving closer or away from the brake disc 6; and a position self-adjusting member 3, which includes a magnetic portion 31 to act on the magnetic members 21, 22 on the floating bracket 2 such that in a braking released state, the floating bracket 2 tends to move towards a balanced position, thereby reducing a difference between a first gap G1 between the first friction plate 25 and the brake disc 6 and a second gap G2 between the second friction plate 41 and the brake disc 6.

Figure 1:
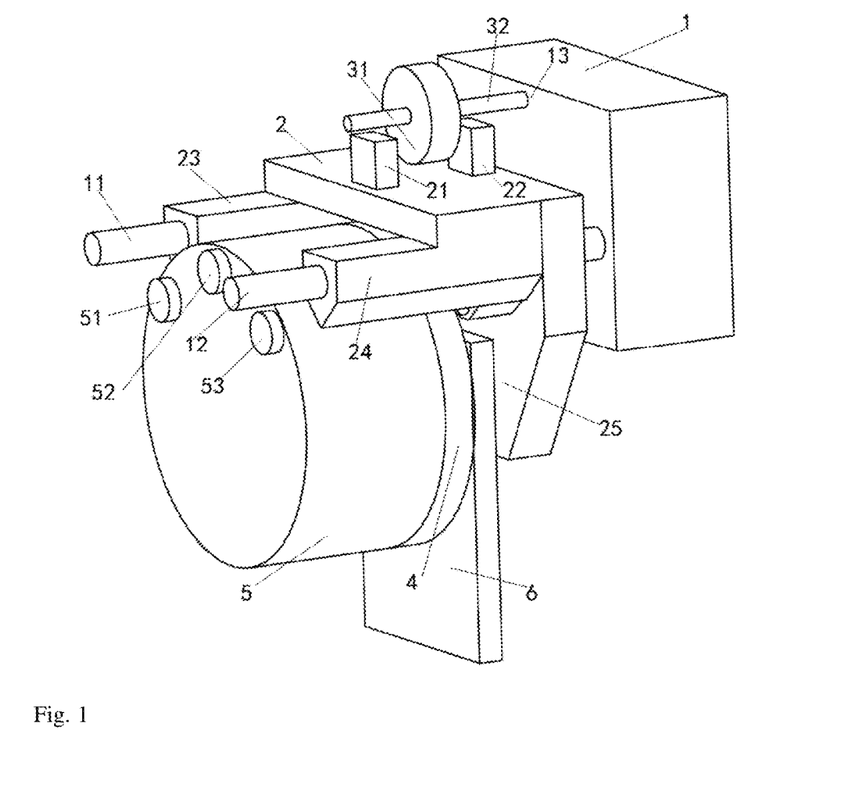
FIG. 1 shows a perspective view of a braking device according to an embodiment of the present disclosure.
Figure 2:
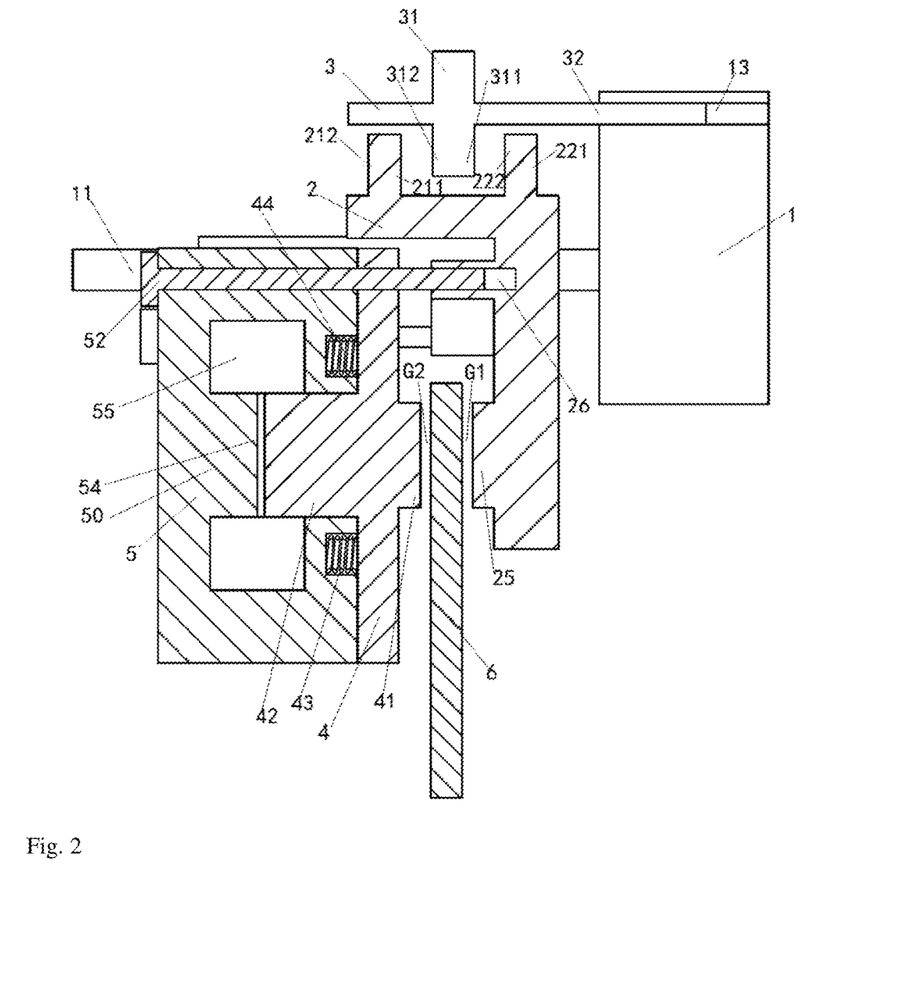
FIG. 2 is a cross-sectional view showing a braking device in a braking released state according to an embodiment of the present disclosure.

The fixed frame 1 is fixed in position and serves to support the entire braking device. The fixed frame 1 has an axial guide. In the illustrated embodiment, the axial guide is two guide pins 11, 12 that extend axially and are inserted into through holes in the floating bracket 2. The floating bracket 2 is supported by the guide pins 11, 12 and is axially movable along the guide pins 11, 12. In some embodiments, in order to provide a more stable support for the floating bracket 2, the floating bracket 2 has extensions 23, 24 around the guide pins 11, 12 so that a contact area of the guide pins 11, 12 with the floating bracket 2 is increased. In some embodiments, a friction coefficient between the guide pins 11, 12 and the floating bracket is less than 0.2, or even smaller, which makes it easier for the floating bracket 2 to move axially along the guide pins 11, 12. For example, surfaces of the guide pins 11, 12 can be polished. In some embodiments, sliding bearings are disposed between the guide pins 11, 12 and the floating bracket 2, and through such a design, it is also easier for the floating bracket 2 to move axially along the guide pins 11, 12. Through the above design, the floating bracket 2 is capable of moving in an axial direction along the axial guide of the fixed frame 1 under a small force such as a magnetic force. It should be understood that although in the illustrated embodiment, the axial guide is in the form of the guide pins 11, 12, other forms of axial guide such as a rail or a slide rail can also be used in other embodiments for supporting the floating bracket 2 and allowing the floating bracket 2 to move in the axial direction.

The floating bracket 2 includes a floating bracket body portion on a first side of the brake disc 6, and the first friction plate 25 on the first side of the brake disc 6 is disposed on the floating bracket body portion. On a second side of the brake disc 6 opposite to the first side, a movable plate 4 is provided, which is supported by the floating bracket 2. The second friction plate 41 is disposed on a front side of the movable plate 4 which faces the brake disc 6. The actuator 5 is disposed on a back side of the movable plate 4 and is capable of acting on the movable plate 4. In the illustrated embodiment, the actuator 5 includes an actuator body 50 with a plurality of springs 43, 44 being disposed between the actuator body 50 and the movable plate 4. The movable plate 4 includes a plunger 42 on a rear side, which is accommodated in a cavity 54 of the actuator body 50. A coil 55 is disposed around the cavity 54 of the actuator body 50. When the coil 55 is energized, the actuator 5, due to electromagnetic induction, attracts the movable plate 4 to closely abut with the actuator 5 against the forces of the springs 43, 44 and to be spaced apart from the brake disc 6, and when the coil 55 is de-energized, the movable plate 4 moves to the right under the action of the springs 43, 44 to approach and contact the brake disc 6. In the illustrated embodiment, the actuator 5 is connected to the floating bracket 2 through a plurality of axial screws 51, 52, 53 which also pass through the movable plate 4 and guide a movement of the guide plate 4 in the axial direction. Although a particular type of actuator 5 is shown in the figures, any other suitable actuator may be selected in alternate embodiments.

Figure 3:
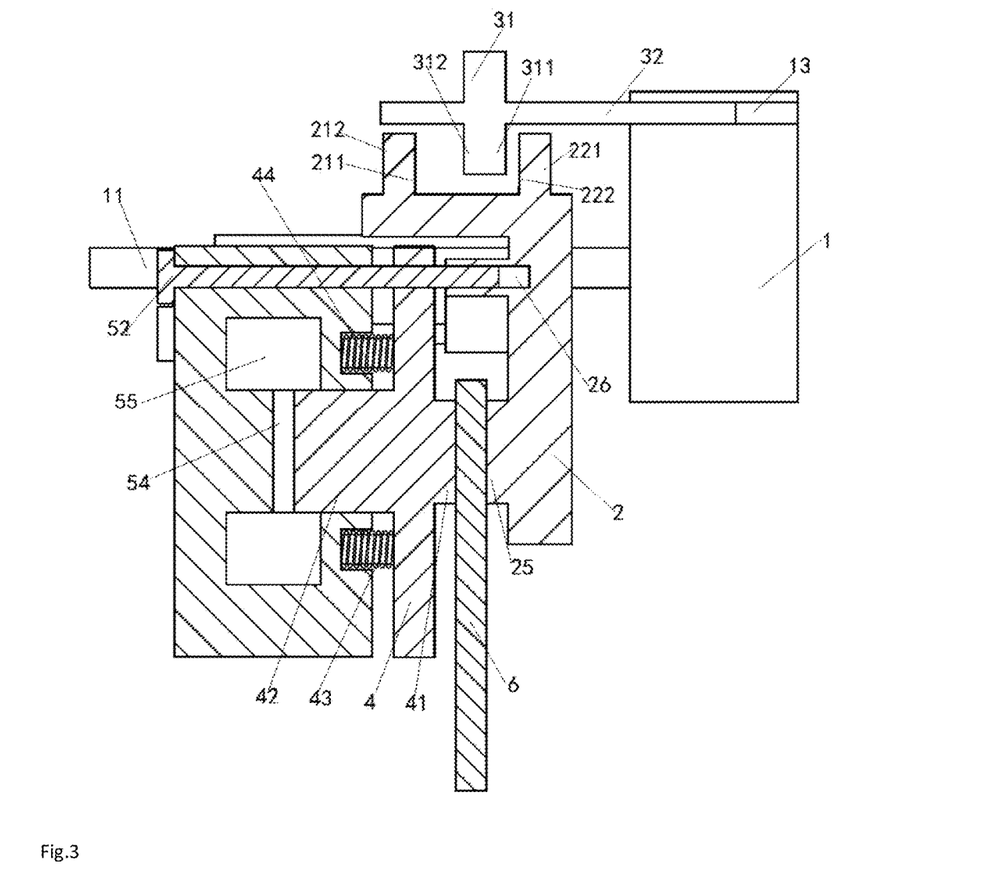
FIG. 3 is a cross-sectional view showing a braking device in a braking state according to an embodiment of the present disclosure.

Upon receiving a braking signal, the actuator 5 pushes the movable plate 4 to move towards the brake disc 6, so that the second friction plate 42 first contacts the second side of the brake disc 6. Then, with the further stretching of the springs 43, 44, the brake disc 6 exerts a reaction force on the movable plate 4, which is transmitted to the actuator 5 so that the actuator 5 drives the floating bracket 2 to move to the left therewith, until the first friction plate 25 contacts the first side of the brake disc 6. In this case, as shown in FIG. 3, the first friction plate 25 and the second friction plate 41 clamp the brake disc 6 until the brake disc 6 stops rotating. Since the brake disc 6 is associated with a drive system of the elevator, for example, the brake disc 6 can be disposed on a drive shaft of the elevator system (it should be understood that only a part of the edge of the brake disc 6 is shown in the figure, the brake disc as a whole is disc-shaped and can be disposed on the drive shaft), when the brake disc 6 is stopped, the elevator drive system will also be stopped, thereby stopping the elevator car.

Figure 4:
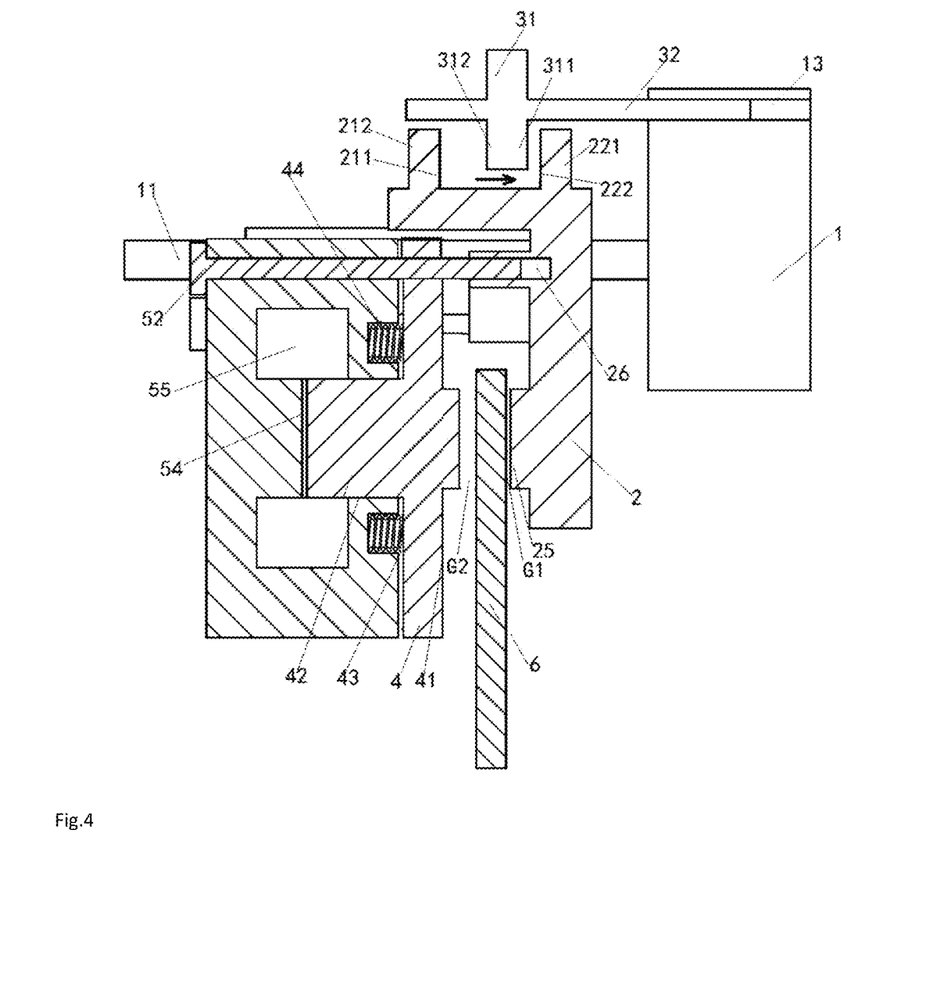
FIG. 4 is a cross-sectional view showing a braking device just after the braking is released according to an embodiment of the present disclosure.

As shown in FIG. 4, upon receiving a braking releasing signal, the actuator 5 will pull back the movable plate 4. For example, by energizing the coil 55 to produce an electromagnetic attraction force, the movable plate 4 is pulled back against the force of the springs 43, 44 so that a second gap G2 is formed between the second friction plate 41 and the brake disc 6. With the removal of the braking force, the brake disc 6 will rotate with the drive shaft and rub against the first friction plate 25, and will push the floating bracket 2 slightly to the right, thereby causing a small first gap G1 to be generated between the brake disc 6 and the first friction plate 25. However, at this point, the first gap G1 between the brake disc 6 and the first friction plate 25 is significantly smaller than the second gap G2 between the brake disc 6 and the second friction plate 41, so that the brake disc may rub against the first friction plate 25 and an axial force is generated. In order to avoid this, the magnetic members 21, 22 are provided on the floating bracket 2 according to an embodiment of the present disclosure, and a position self-adjusting member 3 is further provided, which includes the magnetic portion 31 to act on the magnetic members 21, 22 on the floating bracket 2 so that the floating bracket can be axially moved to the balanced position shown in FIG. 2 in a direction indicated by the arrow, thereby reducing a difference between the first gap G1 and the second gap G2, and avoiding excessive wear on one side of the brake disc or axial force on the brake disc.

The balanced position of the floating bracket 2 is related to an axial position of the magnetic portion 31 of the position self-adjusting member. The axial position of the magnetic portion 31 of the position self-adjusting member may be set in advance based on the position of the friction plate 6, or in some embodiments, the position of the magnetic portion 31 of the position self-adjusting member 3 in the axial direction can be adjusted. For example, the magnetic portion 31 can be axially adjusted relative to the position self-adjusting member 3, for example, the magnetic portion 31 can axially slide and can be locked on the position self-adjusting member 3. In some other embodiments, the position self-adjusting member 3 as a whole is axially adjustable, for example, the position self-adjusting member 3 includes a magnetic portion 31 and a screw portion 32 connected to the magnetic portion 31. The screw portion 32 is connected to an axial threaded hole 13 of the fixed frame 1, and a position of the magnetic portion 31 of the position self-adjusting member 3 is adjusted by adjusting a depth at which the screw portion 32 is screwed into the threaded hole 13. In the illustrated embodiment, the position self-adjusting member 3 can be connected to the fixed frame 1, and in other embodiments, the position self-adjusting member 3 can also be fixed to other devices.

The balanced position of the floating bracket 2 varies with the axial position of the magnetic portion 31 of the position self-adjusting member 3. In some embodiments, the axial position of the magnetic portion 31 of the position self-adjusting member 3 is set such that in the balanced position, a difference between the gap G1 between the first friction plate 25 and the brake disc 6 and the gap G2 between the second friction plate 41 and the brake disc 6 is within 50%, that is, 0.5G2<G1<1.5G2; or a difference between the gap G1 between the first friction plate 25 and the brake disc 6 and the gap G2 between the second friction plate 41 and the brake disc 6 is within 30%, that is, 0.7G2<G1<1.3G2; or a difference between the gap G1 between the first friction plate 25 and the brake disc 6 and the gap G2 between the second friction plate 41 and the brake disc 6 is within 20%, that is, 0.8G2<G1<1.2G2; or the gap G1 between the first friction plate 25 and the brake disc 6 and the gap G2 between the second friction plate 41 and the brake disc 6 are substantially equal, that is, a difference therebetween is within 10%, i.e., 0.9G2<G1<1.1G2. In the braking released state, there are significant gaps between the brake disc 6 and the first friction plate 25 and the second friction plate 41 on both sides, so that the brake disc 6 will not touch the friction plates on both sides during rotation, and will not cause axial force or one-sided wear.

In the embodiments shown in FIGS. 1 to 4, the magnetic portion 31 of the position self-adjusting member 3 may be a permanent magnet, and the magnetic members 21, 22 on the floating bracket 2 may also be permanent magnets. In some embodiments, the magnetic members on the floating bracket 2 include a first permanent magnet 21 and a second permanent magnet 22 that are axially spaced apart, the magnetic portion 31 of the position self-adjusting member 3 is disposed between the first permanent magnet 21 and the second permanent magnet 22, the first permanent magnet 21 is located on a first side of the magnetic portion 31 of the position self-adjusting member 3 and repels a first side 311 of the magnetic portion 31 of the position self-adjusting member 3, and the second permanent magnet 22 is located on a second side of the magnetic portion 31 of the position self-adjusting member 3 and repels a second side 312 of the magnetic portion 31 of the position self-adjusting member 3. For example, the first side 311 of the magnetic portion 31 may be a N pole, and the second side 312 may be an S pole. Then, an inner side 212 of the first permanent magnet 21 is an S pole, and an outer side 211 is a N pole; an inner side 222 of the second permanent magnet 22 is a N pole, and an outer side 211 is an S pole. In the state of FIG. 4, since the first side 311 of the magnetic portion 31 is closer to the inner side 222 of the second permanent magnet 22, a repulsive force to the right will be applied to the floating bracket 2 so that the floating bracket 2 moves to the right, thereby increasing the second gap G2. It should be understood that the floating bracket 2 may swing under the action of the first permanent magnet 21 and the second permanent magnet 22 on both sides, and finally move to the balanced position shown in FIG. 2.

It should be understood that in the illustrated embodiment, the magnetic members 21, 22 are located on the top of the floating bracket 2, and more specifically, the magnetic members 21, 22 are formed as bumps on the top of the floating bracket 2. In other embodiments, the magnetic members 21, 22 may also be disposed at other suitable positions, such as on one side or at the bottom of the floating bracket 2, and the position of the position self-adjusting member 3 should also be adjusted accordingly.

Figure 5:
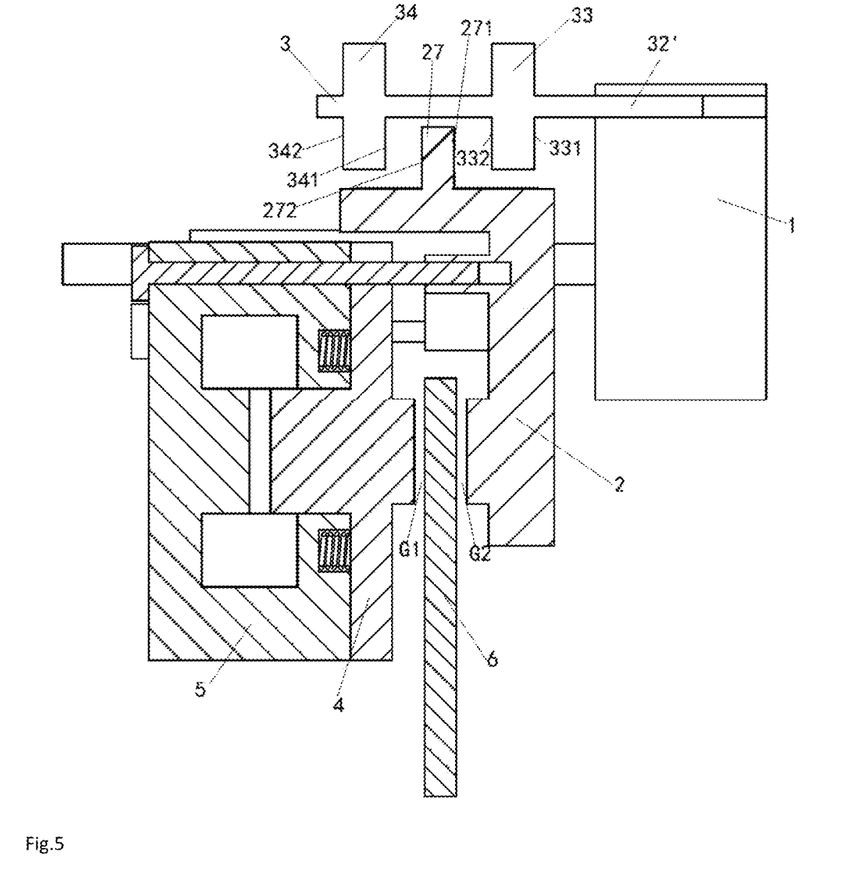
FIG. 5 is a cross-sectional view showing a braking device in a braking released state according to another embodiment of the present disclosure.

With continued reference to FIG. 5, a braking device according to another embodiment of the present disclosure is illustrated. In this embodiment, the magnetic portion of the position self-adjusting member 3 includes a first permanent magnet portion 33 and a second permanent magnet portion 34 that are axially spaced apart, the magnetic member 27 on the floating bracket is located between the first permanent magnet portion 33 and the second permanent magnet portion 34, the first permanent magnet portion 33 is located on a first side of the magnetic member 27 on the floating bracket 2 and repels a first side 271 of the magnetic member 27 on the floating bracket, and the second permanent magnet portion 34 is located on a second side of the magnetic member 27 on the floating bracket 2 and repels a second side 272 of the magnetic member 27 on the floating bracket 2. It should be understood that based on the same principle, such a structure is also capable of moving the floating bracket 2 to a predetermined balanced position. It should be understood that in the art, a combination of the magnetic portion of the position self-adjusting member and the magnetic member of the floating bracket in another configuration can also be contemplated based on magnetic attraction or repulsion, and such a configuration will also fall within the scope of the present disclosure. Further, it should be understood that in the embodiments of the present disclosure, it is desirable that the frictional force between the floating bracket 2 and the axial guide of the fixed frame 1 be as small as possible so that the magnetic force exerted by the magnetic portion of the position self-adjusting member 3 on the magnetic member of the floating bracket 2 is sufficient to drive the floating bracket 2 to move to the balanced position.

In another aspect, the present disclosure also provides an elevator system in which an elevator braking device according to various embodiments of the present disclosure is applied.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. An elevator braking device, comprising:
   a fixed frame, on which an axial guide is disposed;
   a floating bracket, which is disposed on the axial guide of the fixed frame and movable along the axial guide, the floating bracket being provided with a magnetic member and comprising a first friction plate on a first side of the brake disc;
   a movable plate supported by the floating bracket, the movable plate having a second friction plate on a second side of the brake disc;
   an actuator which acts on the movable plate such that the movable plate is capable of axially moving closer or away from the brake disc; and
   a position self-adjusting member, which comprises a magnetic portion to act on the magnetic member on the floating bracket such that after the braking state is released, the floating bracket tends to move towards a balanced position, thereby reducing a difference between a first gap G1 between the first friction plate and the brake disc and a second gap G2 between the second friction plate and the brake disc.

2. The elevator braking device according to claim 1, wherein a position of the magnetic portion of the position self-adjusting member can be adjusted in an axial direction, thereby setting the balanced position.

3. The elevator braking device according to claim 2, wherein the position of the magnetic portion of the position self-adjusting member is set such that in the balanced position, the first gap G1 and the second gap G2 satisfy 0.5G2<G1<1.5G2.

4. The elevator braking device according to claim 2, wherein the position of the magnetic portion of the position self-adjusting member is set such that in the balanced position, the first gap G1 and the second gap G2 are substantially equal.

5. The elevator braking device according to claim 2, wherein the position self-adjusting member is connected to the fixed frame.

6. The elevator braking device according to claim 5, wherein the position self-adjusting member comprises a magnetic portion and a screw portion connected to the magnetic portion, the screw portion is connected to an axial threaded hole of the fixed frame, and the position of the magnetic portion of the position self-adjusting member is adjusted by adjusting a depth at which the screw portion is screwed into the threaded hole.

7. The elevator braking device according to claim 1, wherein the magnetic portion of the position self-adjusting member and the magnetic member on the floating bracket are both permanent magnets.

8. The elevator braking device according to claim 7, wherein the magnetic member on the floating bracket comprises a first permanent magnet and a second permanent magnet that are axially spaced apart, the magnetic portion of the position self-adjusting member is disposed between the first permanent magnet and the second permanent magnet, the first permanent magnet is located on a first side of the magnetic portion of the position self-adjusting member and repels a first side of the magnetic portion of the position self-adjusting member, and the second permanent magnet is located on a second side of the magnetic portion of the position self-adjusting member and repels a second side of the magnetic portion of the position self-adjusting member.

9. The elevator braking device according to claim 7, wherein the magnetic portion of the position self-adjusting member comprises a first permanent magnet portion and a second permanent magnet portion that are axially spaced apart, the magnetic member on the floating bracket is located between the first permanent magnet portion and the second permanent magnet portion, the first permanent magnet portion is located on a first side of the magnetic member on the floating bracket and repels a first side of the magnetic member on the floating bracket, and the second permanent magnet portion is located on a second side of the magnetic member on the floating bracket and repels a second side of the magnetic member on the floating bracket.

10. The elevator braking device according to claim 1, wherein the axial guide is formed as a plurality of guide pins, and the plurality of guide pins are inserted into the floating bracket.

11. The elevator braking device according to claim 10, wherein the floating bracket has an extension around the guide pins.

12. The elevator braking device according to claim 10, wherein a friction coefficient between the plurality of guide pins and the floating bracket is less than 0.2.

13. The elevator braking device according to claim 10, wherein sliding bearings are disposed between the plurality of guide pins and the floating bracket.

14. The elevator braking device according to claim 1, wherein the actuator is fixedly connected to the floating bracket.

15. The elevator braking device according to claim 14, wherein the actuator comprises an actuator body, springs are disposed between the actuator body and the movable plate, the actuator body comprises a cavity for accommodating a plunger of the movable plate, and a coil is disposed around the cavity, and wherein when the coil is energized, the actuator attracts the movable plate to separate from the brake disc against the forces of the springs, and when the coil is de-energized, the movable plate approaches and contacts the brake disc under the action of the springs.

16. The elevator braking device according to claim 14, wherein the actuator is connected to the floating bracket through a plurality of axial screws.

17. The elevator braking device according to claim 16, wherein the plurality of axial screws pass through the movable plate.

18. The elevator braking device according to claim 1, wherein the brake disc is connected to an elevator drive shaft.

19. The elevator braking device according to claim 1, wherein the magnetic member is located at the top of the floating bracket.

20. An elevator system, comprising the elevator braking device according to claim 1.

* * * * *